July 31, 1945. F. G. PIERCE ET AL 2,380,787
DEVICE FOR CUTTING SPONGE RUBBER OR THE LIKE
Filed April 9, 1943 2 Sheets-Sheet 1

Inventors.
Frank G. Pierce and
August H. DeGroote
By Eugene M. Giles
Attorney

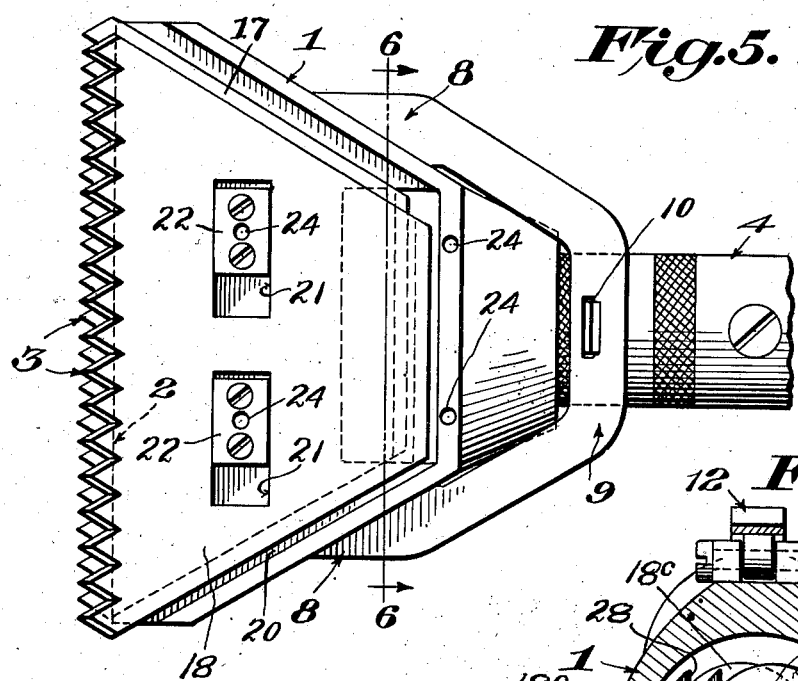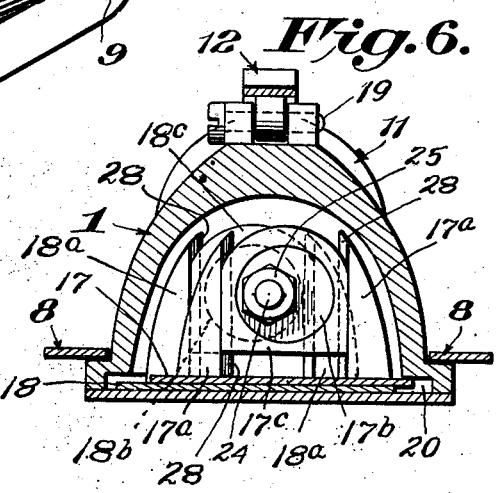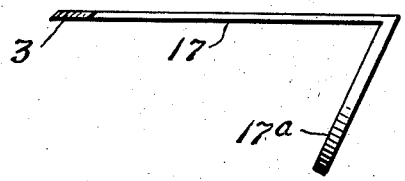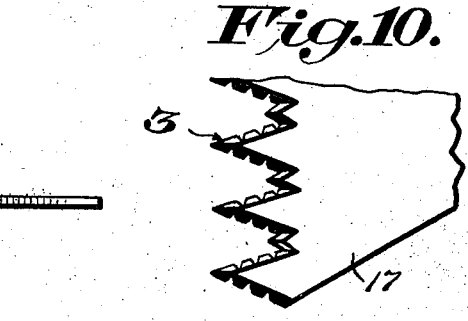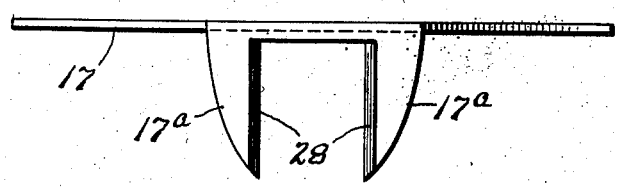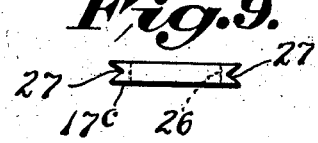
Inventors
Frank G. Pierce and
August H. DeGroote
By Eugene M. Giles
Attorney Patented July 31, 1945

2,380,787

UNITED STATES PATENT OFFICE 2,380,787

DEVICE FOR CUTTING SPONGE RUBBER OR THE LIKE

Frank G. Pierce, Des Moines, Iowa, and August H. De Groote, Rolling Prairie, Ind., assignors to Mishawaka Rubber & Woolen Manufacturing Company, Mishawaka, Ind., a corporation of Indiana Application April 9, 1943, Serial No. 482,496

5 Claims. (Cl. 30—220)

The present invention relates to a means for severing or trimming a mass of cellular elastically yieldable material and is particularly suited and intended for use in cutting and trimming latex foam sponge or the like.

Great difficulty has been experienced heretofore in severing, cutting or trimming soft, elastically yieldable cellular material such as latex foam sponge as the material is so soft and easily compressible that it yields and distorts to such an extent under the pressure of the cutter that it not only is difficult to establish satisfactory cutting engagement with the material but when the cutting occurs the compression and distortion that accompanies the cutting results in such irregularity and unevenness that the cutting is rough and unsatisfactory.

By the device of the present invention, these difficulties heretofore experienced are eliminated as the present cutter engages and cuts the material without appreciable compression or distortion thereof and neat and smooth cut surfaces result.

A pair of reciprocating cutter members are employed, one overlying the other and each with a series of forwardly extending pointed teeth operating oppositely to the movements of the other series of teeth so that there are, in effect, two saws the reciprocating movements of each of which are opposite or counterwise to the reciprocating movements of the other saw.

Thus small portions of the soft material are engaged between the oppositely moving teeth and severed, and, with the cellular material, the points of the teeth enter the cells and sever the intervening walls without any appreciable compression or distortion of the material and thereby insure a neat clean cut without the roughness, irregularity and unevenness that has been experienced with previous methods of cutting such materials.

The principal objects of our invention are to provide an improved means for satisfactorily cutting or severing soft compressible materials such as latex foam sponge; to avoid any appreciable compression or displacement of the material in the cutting operation which might contribute to unevenness or inaccuracy of cutting and to insure a neat clean and accurate cutting of the material; these and other objects being accomplished as pointed out hereinafter and as shown in the accompanying drawings in which:

Fig. 5 is a bottom view of the cutting device with the bottom plate thereof removed to disclose details of the internal construction;

Fig. 6 is a transverse sectional view of the cutting device taken on the line 6—6 of Fig. 5;

Fig. 7 is a lateral edge view of one of the cutters;

Fig. 8 is a rear view of one of the cutters;

Fig. 9 is a top edge view of one of the eccentric blocks through which reciprocating movement is imparted to a cutter; and Fig. 10 is a fragmentary view of a cutter showing a modified form of cutter teeth.

Figure 1:
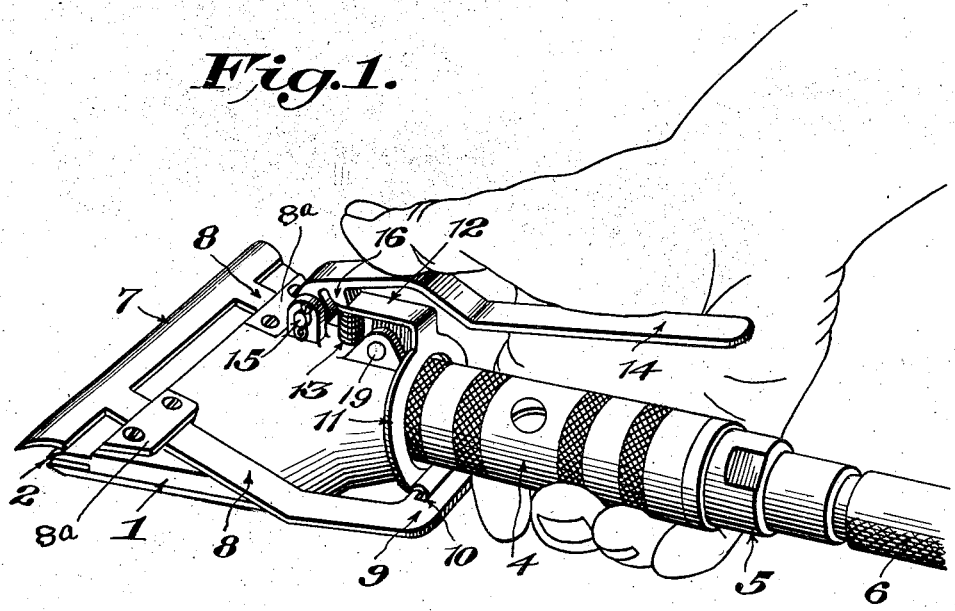
Fig. 1 is a perspective view of a sponge rubber cutting means embodying the features of the present invention, and showing a guard for the cutting teeth, the guard being in its operative position and covering the cutter teeth.

The cutting device of the present invention includes a flat nozzle shaped casing or housing 1 having a straight front edge 2 from which the teeth 3 of a pair of oppositely reciprocating cutter members 17 and 18 project. At the rear end of the casing 1 is a hollow cylindrical shank member 4 which serves as a handle and through which a flexible shaft 6 is connected to the operating mechanism of the cutter, said flexible shaft 6 being secured to the rear end of the handle 4 by a suitable coupling 5.

Figure 2:
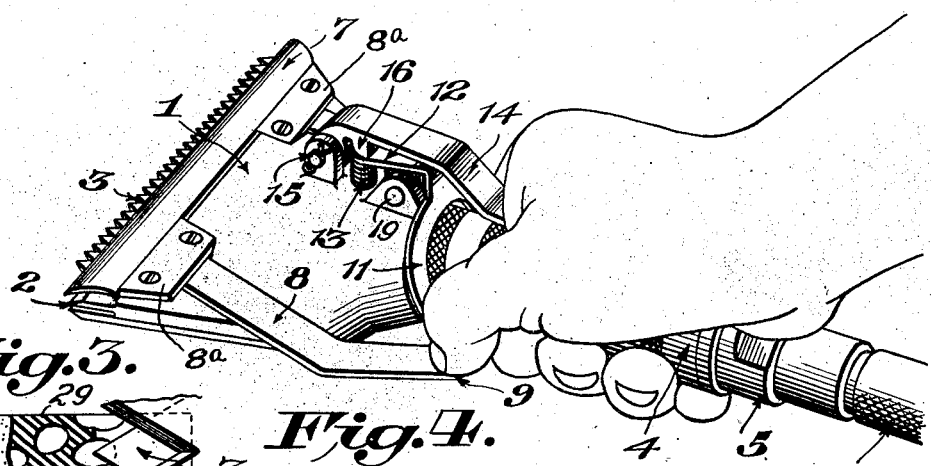
Fig. 2 is a similar view showing the guard retracted to expose the cutter teeth for the operation of the device.

A safety device is provided to cover the cutter teeth when the device is not in actual use and while the cutter members are inoperative or inactive, and for this purpose there is provided a guard 7 in the form of a substantially straight flat bar overlying and covering the cutter teeth 3, as indicated in Fig. 1, and capable of being drawn rearwardly to a position as shown in Fig. 2 so as to expose the cutter teeth 3 for use. A pair of arms 8 extend rearwardly from the guard 7 and through guides 8ᵃ to a position at or in rear of the rear end of the casing 1, where they are connected by a cross bar 9, the arms 8 and the cross bar 9 constituting a substantially U-shaped yoke. Pivotally connected as at 10 to the cross bar portion 9 is an upstanding arm 11 of a bell crank lever which is pivoted at 19 to the casing 1, said arm 11 being apertured or ring shaped as shown so that the handle 4 extends loosely therethrough. The other arm 12 of the bell crank extends forwardly from the top of the arm 11 and overhangs the casing 1. Beneath the front free end of the arm 12 is a suitable spring 13 bearing in opposite directions against the top of the casing 1 and the underside of the arm 12 so as to maintain the latter in an elevated position with the guard 7 at its front limit and covering the cutter teeth 3. For moving the guard 7 rearwardly, to uncover the cutter teeth, there is provided a hand lever 14, fulcrumed at its front end as at 15 on the top of the casing 1, the underside of the forward portion of the lever 14 being provided with a cam member 16 in cooperative relation with the top of the arm 12 towards the front free end thereof. The lever 14 extends rearwardly across the top of the shank or handle 4, whereby the shank 4 and the lever 14 may be grasped in the palm of the hand so as to swing the lever 14 downwardly on its fulcrum 15 to press the cam 16 against the forward end of the arm 12 to depress same and move the bottom portion of the arm 11 rearwardly, thereby to move the yoke arms 8 rearwardly and withdraw the guard 7 from its normal operative position as shown in Fig. 1, to its inoperative position as shown in Fig. 2, thus exposing the cutter teeth 3 for operation. Upon releasing the grip of the hand, the spring 13 will act to return the lever 14 to its normal position and to move the guard 7 forwardly into a position overlying and covering the cutter teeth 3.

The cutter members 17 and 18 are alike, except that the member 17 is slightly shorter than the member 18, and they are mounted for lateral reciprocation in a slideway 20 in the bottom of the casing 1. The cutter 17 is directly above the cutter 18, and both have a pair of transverse slots 21 therein which engage guide lugs 22 which extend downwardly from the casing 1 into the slideway 20 and confine the operation of the cutters 17 and 18 to a straight line movement parallel to the forward edge 2 of the casing through which the teeth 3 project.

A bottom plate 23 closes the slideway 20 at the bottom and slidably confines the cutters 17 and 18 therein, this plate being secured to the casing by screws (not shown) which engage screw holes 24 in the bottom of the casing 1 and the guide lugs 22.

Each cutter member 17 and 18 has its rear end upturned and notched to provide laterally spaced upwardly extending arms lying in planes at right angles to the axis of the shank or handle 4, those of the cutter member 17 being indicated at 17ᵃ and of the cutter member 18 at 18ᵃ, and it will be observed that the arms 17ᵃ of the cutter member 17 are directly in front of the arms 18ᵃ of the cutter member 18 and to this extent the cutter member 17 is shorter than the cutter member 18 as previously mentioned.

A shaft, which is connected with and operated by the flexible shaft 6, extends lengthwise through the shank or handle 4 and has the inner end 24 thereof projecting into the notches between the upturned arms 17ᵃ and 18ᵃ of the cutter members 17 and 18. Said inner end 24 of said shaft has a pair of eccentrics 17ᵇ and 18ᵇ secured thereon by the nut 25, the eccentric 17ᵇ lying in the plane of the upturned arms 17ᵃ of the cutter member 17 and the eccentric 18ᵇ lying in the plane of the upturned arms 18ᵃ of the cutter member 18, and these eccentrics are fixed on the shaft 24 each at a half turn around the axis of the shaft 24 from the other so that they act oppositely.

Each pair of arms 17ᵃ and 18ᵃ constitutes a slideway for a block in which the respective eccentric 17ᵇ or 18ᵇ operates, the block which is slidably mounted between the arms 17ᵃ being indicated at 17ᶜ and the sliding block between the arms 18ᵃ being indicated at 18ᶜ, and each block 17ᶜ and 18ᶜ has a circular opening 26 (see Fig. 9) in which its respective eccentric 17ᵇ or 18ᵇ is engaged.

These blocks 17ᶜ and 18ᶜ have V-shaped notches 27 (see Fig. 9) in their lateral edges and the inner edges of the arms 17ᵃ and 18ᵃ are V-shaped as indicated at 28 to fit in the V-notches 27 of the respective block 17ᶜ or 18ᶜ to hold each block in place between its respective arms 17ᵃ or 18ᵃ.

With this construction, as the shaft 24 is rotated the eccentrics 17ᵇ and 18ᵇ rotate therewith and, through the blocks 17ᶜ and 18ᶜ and the engagement thereof with the respective arms 17ᵃ and 18ᵃ, impart lateral reciprocating movement to the cutter members 17 and 18, and as the eccentric 17ᵇ is one-half turn in advance of the eccentric 18ᵇ on the shaft 24, movement is imparted to the cutter member 17 to the right while movement is imparted to the cutter member 18 to the left and vice versa.

Figure 3:
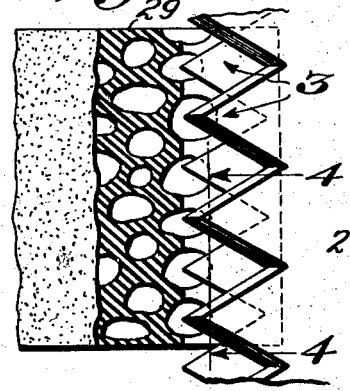
Fig. 3 is an enlarged diagrammatic view illustrating the manner in which the cutting teeth sever the cell walls of a piece of sponge rubber.
Figure 4:
Fig. 4 is an enlarged detail sectional view on the line 4—4 of Fig. 3.

The manner in which the cutting implement operates to sever a piece of sponge rubber is illustrated diagrammatically in Figs. 3 and 4 of the drawings wherein 29 designates a piece of sponge rubber, a portion of which has been broken away to expose the cellular structure thereof. In using the implement, it is grasped by the hand of the user in the manner shown in Fig. 2 so as to retract the guard 7 and expose the cutter teeth 3, whereupon the cutter teeth are brought up against the piece or mass of sponge rubber 29 and the pointed ends of the cutter teeth are thrust into the rubber material so that when the cutter blades are reciprocated they will simultaneously sever the thin walls between successive cells without compacting or distorting the sponge rubber mass. Of course, the cutting device is moved forwardly so as to thrust the points of the cutter blades into the rubber material and the continued reciprocating movement of the blades will continue the operation of severing the relatively thin walls between cells, whereby a clean and relatively smooth cutting or severing of the cellular material is accomplished in a very simple and effective manner. It will here be noted that each pair of cooperating cutter teeth 3 on opposite blades produce a shearing action, but this shearing action is on a very thin portion of the rubber material, and as there is a simultaneous action of a plurality of cooperating pairs of teeth, there is no compacting of the material and the thin cell walls are cut or severed without any tearing action, thus resulting in a cutting or severing of the material which will leave the cut edges in a relatively smooth and unbroken condition.

The teeth 3 of the cutters may be ordinary pointed cutter teeth such as shown in Figs. 3, 4 and 5, but we have found it advantageous to employ more sharply pointed or more acutely angled teeth such as shown in Fig. 10, and we have further found it advantageous and to facilitate cutting to notch the lateral edges of the teeth as indicated at 30 in Fig. 10.

While we have shown and described our invention in a preferred form, we are aware that various changes and modifications may be made without departing from the principles of our invention, the scope of which is to be determined by the appended claims.

What is claimed is:

1. A device for cutting cellular elastically yieldable material comprising a pair of parallel oppositely reciprocatory blades having cutter teeth in cooperative relation, a housing for the blades, the cutter teeth projecting at the front of the housing, a hollow shank extending from the rear of the housing and constituting a handle for the device, a coupling carried by the rear end of the combined shank and handle for connection with flexible shafting, a guard member for covering the cutter teeth and comprising a bar normally overlying and extending outwardly beyond said teeth, means for maintaining said guard member in said normal position, and means for withdrawing the guard member to expose the teeth for use in the operation of the device.

2. A device for cutting cellular elastically yieldable material comprising a pair of parallel oppositely reciprocatory blades having cutter teeth in cooperative relation, a housing for the blades, the cutter teeth projecting at the front of the housing, a hollow shank extending from the rear of the housing and constituting a handle for the device, a coupling carried by the rear end of the combined shank and handle for connection with flexible shafting, a guard bar for covering the cutter teeth, a yoke extending rearwardly from the cutter bar, another yoke straddling the shank and pivotally connected with the first mentioned yoke and provided with an arm overlying the housing, a spring cooperating with the arm to hold the guard bar in its forward position across the teeth, and a hand lever fulcrumed upon the casing and having a cam in cooperative relation with the arm to move the arm against the action of the spring.

3. A cutting device of the class described comprises a casing having a slotted edge, a pair of oppositely reciprocable plates in the casing, each plate having a series of cutter teeth projecting through said slotted edge of the casing, a handle projecting rearwardly from the casing and having a rotatable shaft therein with a pair of eccentrics at the forward end thereof in the casing, and each of the aforesaid plates having spaced upturned portions between which a respective one of the eccentrics operates to impart opposite reciprocation to the plates.

4. A shearing device of the type described comprising, a housing having a slotted front, a pair of cutting blades positioned in said housing in face to face relationship and having teeth projecting outwardly through said slot, means within said housing for simultaneously reciprocating said blades in opposite directions, said blades having registering guideways, and a guide element projecting into said guideways to confine the movement of said blades to straight line movement parallel to the housing slot.

5. A shearing device of the type described comprising, a housing having a slotted front, a pair of cutting blades positioned in said housing in face to face relationship and having teeth projecting outwardly through said slot, each blade having a pair of laterally spaced upstanding arms within said housing, an apertured block held between each of said pairs of arms in vertically slidable manner, and an eccentric engaged within the aperture of each of said blocks for simultaneously reciprocating said blades in opposite directions.

FRANK G. PIERCE.
AUGUST H. DE GROOTE.